R. VOSE.
Spiral-Spring.
No. 199,945. Patented Feb. 5, 1878.
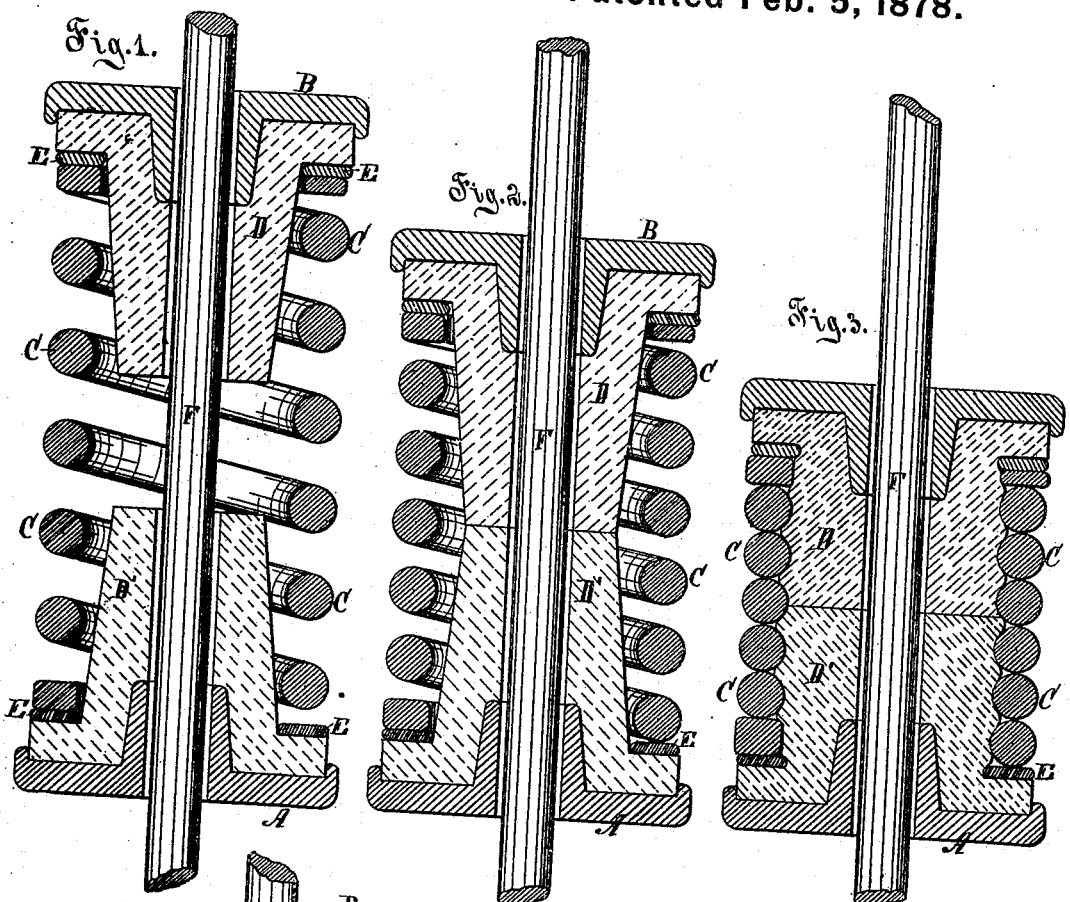
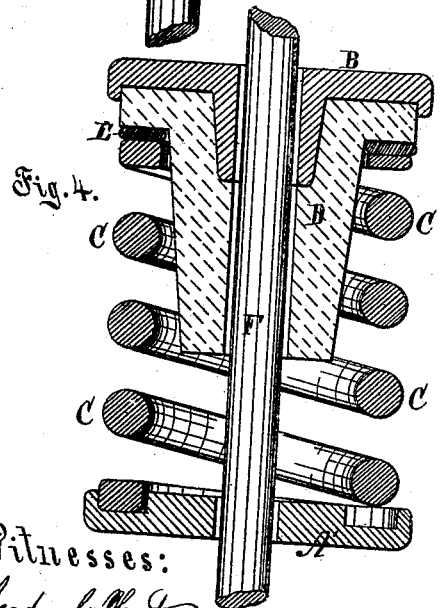

UNITED STATES PATENT OFFICE.

RICHARD VOSE, OF NEW YORK, N. Y., ASSIGNOR TO JOHN VAN DEUSEN REED, OF SAME PLACE.

IMPROVEMENT IN SPIRAL SPRINGS.

Specification forming part of Letters Patent No. 199,945, dated February 5, 1878; application filed September 18, 1877.

*To all whom it may concern:*

Be it known that I, RICHARD VOSE, of the city of New York, county and State of New York, have invented a new and useful Improvement in Rubber-Center Spiral Springs for Railway-Cars and other Purposes, of which the following is a specification, reference being had to the accompanying drawings, forming part thereof, in which—

Figure 1 is a sectional view of my invention, showing my improved rubber-center spiral spring in its natural shape, no pressure or weight being applied. Fig. 2 represents a sectional view of the same so weighted that the cores of rubber touch in the center, the coil being pressed downward. Fig. 3 is a sectional view of the same, showing the cores of rubber expanded so as to fill the entire inner space of the coil, and pressing tight against the coil, the coil being pressed to its lowest limit. This represents the maximum capacity of my spring. Fig. 4 is a sectional view of my spring, but one rubber core being used. Fig. 5 is a side view of the cap, rubber core, and washer used in the construction of my spring.

Hitherto rubber-center spiral springs have been so constructed that both the spiral coil and rubber, each being of equal length, were brought into action simultaneously, or nearly so, on the application of weight, and as the pressure was increased the longitude of both the coil and rubber was diminished, and before the maximum bearing capacity of the spring was reached the rubber, by expansion, not only filled the inner space of the coil, but was pressed laterally outward, and was chafed or "chewed up" under the several coils, and soon rendered worthless.

My invention relates to the use of one or two rubber cores conically shaped, and whose length is less than that of the coil, and so constructed that pressure or weight on the spring first reduces the longitude of the coil, causing the rubber cores to just touch each other, or, if a single core is used, causing the apex to touch the bed-plate. On increasing the weight the rubber, acting as an auxiliary to the spiral coil, is expanded, so that when the maximum bearing capacity of the spring is reached and the coils lie tightly one above the other, as shown in Fig. 3, the rubber fills the inner space, and is pressed snugly against the walls of the coil, so as to slightly curve between the spirals of the coil, and yet, the apex of the core being much smaller than the base, there is not such an excess of rubber in its expanded form as to outcrop between the coils, and consequently it is not "chewed up."

In the drawings, A represents the base-plate, constructed in the ordinary way; B, the cap, not differing from those in common use. C is the steel spiral coil, and D the conical-shaped rubber core or center, or "frustum" of rubber, as I call it. This rubber frustum or core is so made that the rubber tapers toward the apex. Wings or flanges are formed upon the base, which wings project over and form a cushion or packing, on which the coil rests, E, a washer, only intervening between the coil and said flange, to prevent all chafing of the rubber. A rod, F, passes through a hole made through the cap, core, and bed-plate, like the rest of spiral springs. A metallic projection is formed on the cap B, which sinks into a properly-shaped cavity in the rubber core, and serves to prevent lateral motion of either.

As shown in Fig. 4, by the use of one rubber core the longitude of which, as represented in the drawings, is less than that of the coil, though, if desired, it may be of equal length, I obtain a light-weighted spring suitably adapted for street-cars and other purposes. By this novel method of the tapering rubber core I am enabled to use a less-weighted, and consequently a less-cumbersome, coil, as the coil has but little inward lateral pressure of the rubber to resist; also, less rubber is used as an auxiliary elastic packing, thus making a cheaper and yet more endurable spring.

When I desire to produce a spring of great bearing-power for railway-cars, I group together a number of my springs, constructed, as above set forth, with two rubber cones about double the size as set forth in the drawings, and having a suitable cap, box, and base to hold the several springs in position, and so that they will not come in contact with each other, while they will at the same time have freedom of vertical motion. I thus form a combination that constitutes in its action a single spring of any required power of resistance, which, while it has great elasticity and range of motion, is perfectly graduated, and is as endurable as any spring now made.

I claim and desire to secure by Letters Patent—

1. A rubber-center spiral spring composed of a steel spiral coil, in combination with and having in its interior a column of rubber, consisting of one or two conically-shaped cores, the longitude of which column is less than that of the spiral coil, as shown and described.

2. A rubber-center spiral spring composed of a steel spiral coil, in combination with and having in its interior a column of rubber, consisting of one or two conically-shaped cores, as shown and described.

3. A rubber-center spiral spring composed of the combination of the bed-plate A, cap B, and rubber core or cores D D', as shown and described.

Witness my hand this 15th day of September, 1877.

RICHD. VOSE.

Witnesses:
JOHN S. SILVER,
HUGH McMASTER.